June 11, 1935.  W. FEAN  2,004,315
PACKING LINER
Filed Aug. 29, 1932  2 Sheets-Sheet 1
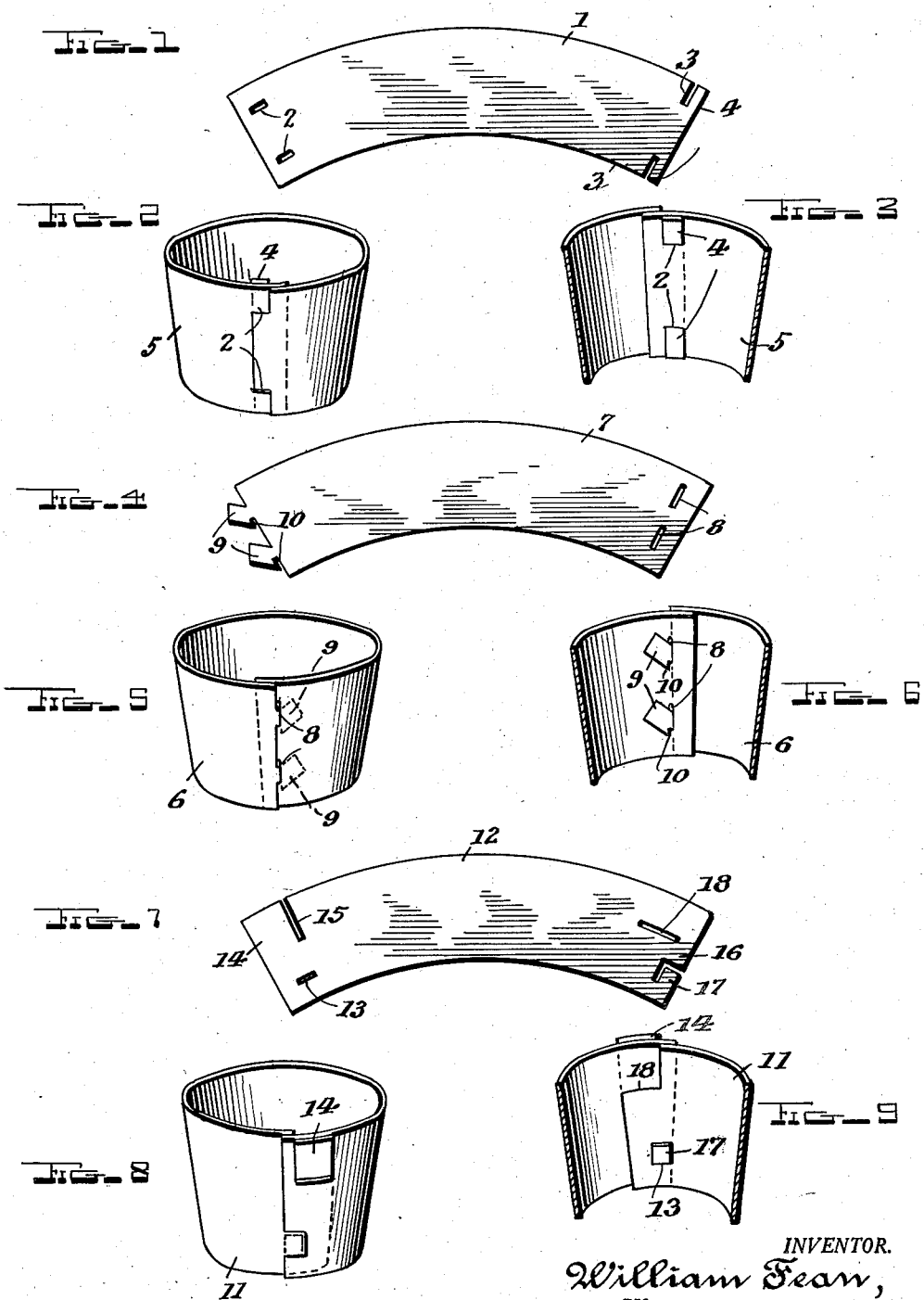

June 11, 1935.　　　　　W. FEAN　　　　　2,004,315
PACKING LINER
Filed Aug. 29, 1932　　　2 Sheets-Sheet 2
Fig. 10
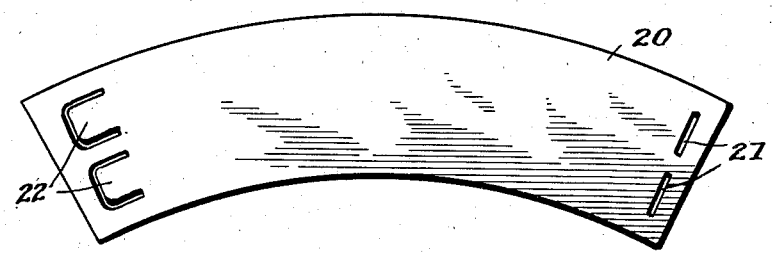
Fig. 11　　　　Fig. 12
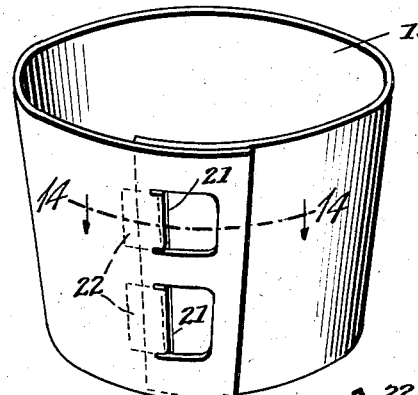 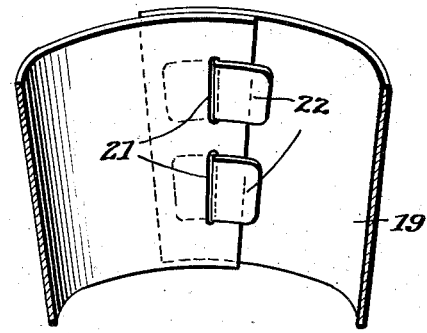
Fig. 13
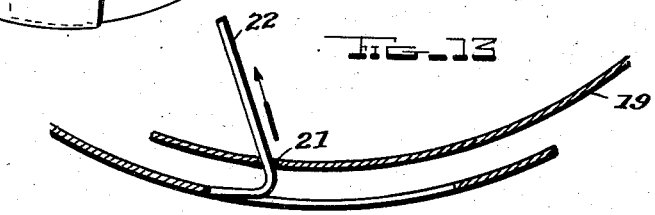
Fig. 14
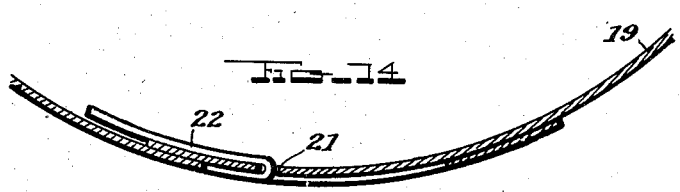
INVENTOR.
William Fean,
BY
Jacobi & Jacobi ATTORNEYS.

Patented June 11, 1935

2,004,315

UNITED STATES PATENT OFFICE 2,004,315

PACKING LINER

William Fean, Columbus, Ohio, assignor to Thomas R. McDonald, Columbus, Ohio

Application August 29, 1932, Serial No. 630,917

1 Claim. (Cl. 217—3)

This invention relates to liners of the type used when packing fruit, vegetables and the like in containers such as a bushel basket in order to prevent the fruit from contacting with walls of the basket and becoming bruised or the skin torn. It is well known that if fruit such as apples or peaches become bruised or the skin torn, decay will set in and a few damaged fruit in a basket will cause the entire basket of fruit or a major portion thereof to quickly spoil. Therefore, one object of the invention is to provide a liner which when in use will fit closely against walls of a basket and will not be liable to be torn during packing of the fruit or by pressure exerted.

Another object of the invention is to provide a liner which may be formed from a strip of strong paper or similar paper, the strips being initially flat in order that they may be stacked and thereby conveniently shipped and also stored in a small space.

Another object of the invention is to so form the sheet that when end portions of a sheet are united, a liner of an inverted frusto-conical shape will be formed, thereby permitting the liner to fit properly within a fruit basket in close contacting engagement with its walls.

A still further object of the invention is to provide a liner strip having its end portions formed with companion slots and tongues by means of which ends of a strip may be very easily and quickly united to form a liner and the overlapped ends of the strip firmly held in engagement with each other and not be liable to be separated by pressure exerted when the liner is filled with fruit in an inverted position and a form removed in order to permit a basket to be applied to the filled liner.

Still another object of the invention resides in providing a device which is simple and durable in construction, inexpensive to manufacture and one which will be very efficient in operation and application to use.

With these and numerous other objects in view, my invention consists in the novel features of construction, combination and arrangement of parts as will be hereinafter referred to and more particularly pointed out in the specification and claim.

In the accompanying drawings forming a part of this application:

Figure 1 is a view of a blank or strip from which a liner of the improved construction is formed;

Figure 2 is a perspective view of a liner formed from the strip shown in Figure 1;

Figure 3 is a sectional view taken through the liner shown in Figure 2;

Figure 4 is a view of a modified form of blank or strip;

Figure 5 is a perspective view of a liner formed from the strip shown in Figure 4;

Figure 6 is a sectional view through the liner shown in Figure 5.

Figure 7 is a view of another modified form of strip;

Figure 8 is a perspective view of a liner formed from the strip shown in Figure 7;

Figure 9 is a sectional view taken through the liner shown in Figure 8;

Figure 10 is a view of a further form of strip from which a liner may be formed;

Figure 11 is a perspective view of a liner formed from the strip shown in Figure 10;

Figure 12 is a sectional view through the liner shown in Figure 11;

Figure 13 is a fragmentary sectional view illustrating the manner in which tongues at one end of the strip shown in Figure 10 are passed through the slots in the other end of the strip, when forming the liner; and Figure 14 is a sectional view through the liner taken along the line 14—14 of Figure 11.

The liner constituting the subject matter of this invention serves as a liner for a fruit basket in which peaches, pears, apples or other easily damaged fruit or vegetables are to be packed. When packing fruit a base such as shown in my prior Patent No. 1,641,073, issued August 30th, 1927, is first set upon a table or other support and a layer of fruit placed in this base in symmetrical form. A frusto-conical liner is then set in place upon the base together with a frusto-conical shaper or form which fits about the liner after which fruit is poured into the form until the form is completely filled.

The form is then withdrawn and a basket set in place. The filled basket and base are then turned from an inverted position to an upright position and the base removed and a cover set in place and secured. At the present time, it is customary to form liners of paper or other similar paper having its ends secured and the ends of the paper strip are either releasably secured in order to permit the liner to expand after the basket has been expanded and turned to an upright position and the base removed or the liner is formed of paper which will be torn by the weight and pressure of the fruit when the basket is upright. This has been found undesirable as torn places in a paper lining will permit fruit to contact with walls of the basket and if ends of the strip are released, they are liable to move too far apart and permit contact of fruit with the walls of the basket.

In order to overcome the objections noted above, the liner formed in accordance with this invention consists of a strip of paper sufficiently strong to prevent tearing both during the intervals when a shaper is removed and a basket applied and also after the basket has been turned to an upright position and ends of the strip are united in such a manner that they will not be liable to come apart. The strip 1 shown in Figure 1 is arcuate in shape and has one end portion cut to form slots 2 spaced from each other transversely of the strip. Adjacent its other end, the strip is cut from its arcuate side edges as shown at 3 to form transversely extending tongues 4. The strip is bent to dispose its end portions in overlapping relation to each other and thereby define a frusto-conical liner 5 and by passing the tongues 4 through the slots 2, the ends of the strip will be firmly secured in overlapped relation to each other. By having the tongues extending inwardly through the slits, there will be no danger of the tongues being caught and torn off when a shaper or basket is set in place. A liner so constructed may be very easily set in place upon a base and when a form is removed after being filled in order to apply a basket, there will be no danger of ends of the strip coming apart and allowing the fruit to spill. As the strip is formed of tough paper having sufficient strength to withstand pressure exerted by fruit poured into the liner and shaper, there will be no danger of the liner being torn when the shaper is removed and a basket is applied and after the filled basket and base have been turned from an inverted to an upright position, the pressure exerted by the fruit will not tear the paper or cause ends of the liner to spread apart and permit fruit to contact with the rough sides of the basket and become damaged.

In the embodiment of the invention illustrated in Figures 4, 5 and 6, the liner 6 is formed from a strip of tough paper 7 which is arcuate longitudinally and conforms to the general shape of the strip shown in Figure 1, except that the slots 8 extend transversely of the strip adjacent one end instead of longitudinally thereof and the other end of the strip instead of being cut to form tongues extending transversely of the strip, is provided with tongues 9 extending from the end of the strip.

By referring to Figure 4, it will be seen that the tongues 9 project diagonally from the body portion of the strip and each is cut at its junction with the strip to form a bill 10. By this arrangement, the tongues 9 may be slid through the slots 8 in the opposite end portion of the strip and after the tongues have been passed through the slots, end portions of the strip moved transversely of each other to bring the bill into interlocking engagement with the strip at lower ends of the slot. Therefore, end portions of the strip will be retained in overlapped engagement with each other and strain exerted longitudinally of the strip or in other words circumferentially of the liner will not cause the tongues to slip outwardly through the slot, and ends of the strip cannot move out of engagement with each other.

In Figures 7, 8 and 9, there has been shown another modified construction wherein the liner 11 is formed from a strip 12 of tough paper which is arcuate longitudinally and has one end portion cut to form a slot 13 and tongue 14, the slot 13 extending longitudinally of the strip near its lower edge and the tongue 14 extending transversely of the strip and being formed by a slit 15 cut from the upper edge of the strip. At its opposite end, the strip is cut as shown at 16 to form a tongue 17 extending transversely of the strip and between the slit 16 and upper edge of the strip, a slot 18 is formed which extends longitudinally of the strip. By this arrangement, the end portions of the strip may be disposed in overlapping relation to each other with the tongue 14 extending upwardly and outwardly through the slit 18 and the tongue 17 projected inwardly and upwardly through the slit 13. This construction and arrangement of parts permits end portions of the strip to be easily and quickly united and when so united, they will be firmly held in engagement with each other and prevented from working loose.

The liner 19 illustrated in Figure 10, through 14, is also formed from an arcuate strip 20 of tough paper or other suitable paper. At one end, the strip is cut to form transversely extending slots 21 and adjacent its other end the strip is cut to form tongues 22 extending longitudinally of the strip in spaced relation to each other transversely thereof. These tongues face the end of the strip and are of such width that they may be passed inwardly through the slots 21. In view of the fact that the tongues extend longitudinally of the strip and may be bent at any point, end portions of the strip may be sufficiently overlapped to form a liner of predetermined diameter and the tongues then passed through the slots as shown in Figure 13 and then folded flat against the liner. Since the tongues when folded extend back upon themselves and are subject to pressure by contact with fruit if the tongues are passed inwardly through the slots or engagement with walls of a form or basket if the tongues are passed outwardly, they will be firmly held against retrograde movement through the slit end portions of the strip and prevented from sliding longitudinally out of engagement with each other.

From the foregoing description of the construction of my improved device, the application thereof to use will be readily understood. It will be seen that I have provided a simple, inexpensive and efficient means for carrying out the objects of the invention and while I have particularly described the elements best adapted to perform the functions set forth, it is obvious that various changes in form, proportion and in the minor details of construction may be resorted to, without departing from the spirit or sacrificing any of the principles of the invention.

Having thus described the invention, what is claimed is:

A liner for a basket comprising a strip of material bent to dispose its end portions in overlapped relation to each other and form an open ended liner of a diameter to fit within a basket in close proximity to walls thereof, one end portion of said strip being formed with a longitudinally extending slot adjacent its lower edge, the said end portion of the strip being slit downwardly from its upper edge in spaced relation to the adjacent end edge of the strip to form a tongue located above the slot, the other end portion of the strip being formed with a longitudinally extending slot spaced from the upper edge of the strip a distance corresponding to the depth of said tongue, the lower portion of the last mentioned end portion of the strip being slit longitudinally from the end edge of the strip and then downwardly to form a tongue having its attached lower end spaced from the lower edge of the strip a distance corresponding to the distance between the first slot and the lower edge of the strip, the tongue of the second mentioned end portion of the strip being passed inwardly and upwardly through the slot of the first mentioned end portion of the strip and the tongue of the first mentioned end portion of the strip being passed outwardly and upwardly through the slot of the second mentioned end portion of the strip.

WILLIAM FEAN.